United States Patent [19]

Park

[11] Patent Number: 5,558,481
[45] Date of Patent: Sep. 24, 1996

[54] SELF-LOCKING QUICK DISENGAGEMENT NUT FOR CLAMPS AND THE LIKE

[76] Inventor: Joon Park, 1320 Virginia Ave., Glendale, Calif. 91202

[21] Appl. No.: 452,840

[22] Filed: May 30, 1995

Related U.S. Application Data

[63] Continuation-in-part of Ser. No. 187,739, Jan. 28, 1994, abandoned.

[51] Int. Cl.$^6$ ............................ F16B 37/08; F16B 37/16
[52] U.S. Cl. ............................ 411/433; 411/432; 411/437
[58] Field of Search ................................. 411/432, 433, 411/437, 366, 935

[56]  References Cited

U.S. PATENT DOCUMENTS 1,008,145  11/1911  Heeter ................................. 411/437 X
1,589,307   6/1926  Svebilius ................................. 411/433
2,066,541   1/1937  Schenk ................................... 411/437
2,261,537  11/1941  Zamarra ................................. 411/437
3,878,757   4/1975  Puklus, Jr. .............................. 411/433

FOREIGN PATENT DOCUMENTS 7509066   2/1976  Netherlands ............................ 411/433

*Primary Examiner*—Neill R. Wilson
*Attorney, Agent, or Firm*—Allen A. Dicke, Jr.

[57]  ABSTRACT

The self-locking quick disengagement nut has a bore therethrough which clears the threads of a thrust screw. On another axis, intersecting the clearance axis, a threaded bore has thrust screw-engaging threads. The nut is formed of two parts, lying substantially in opposite sides of the plane through the axes. The pivot pin lies closer to the threaded shaft axis than the major diameter of the threaded shaft so that the thrust screw urges the nut toward thread engagement without applying excessive bending to the thrust screw.

21 Claims, 2 Drawing Sheets

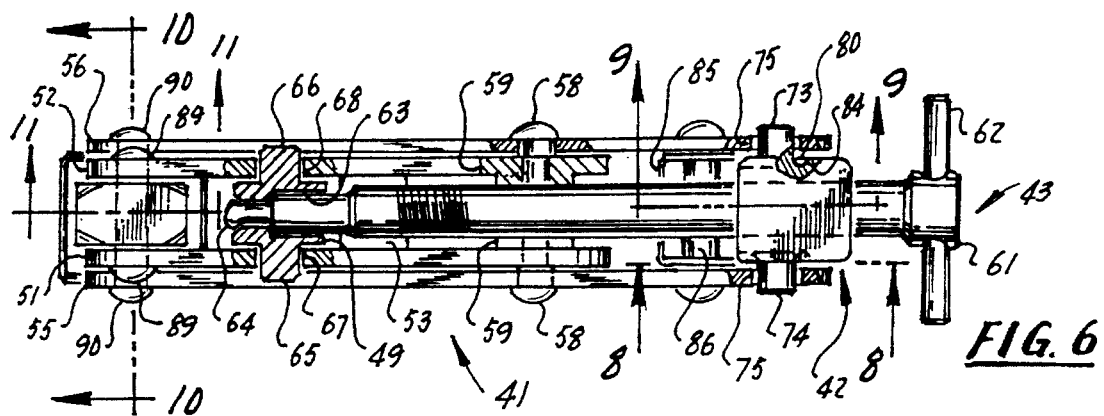
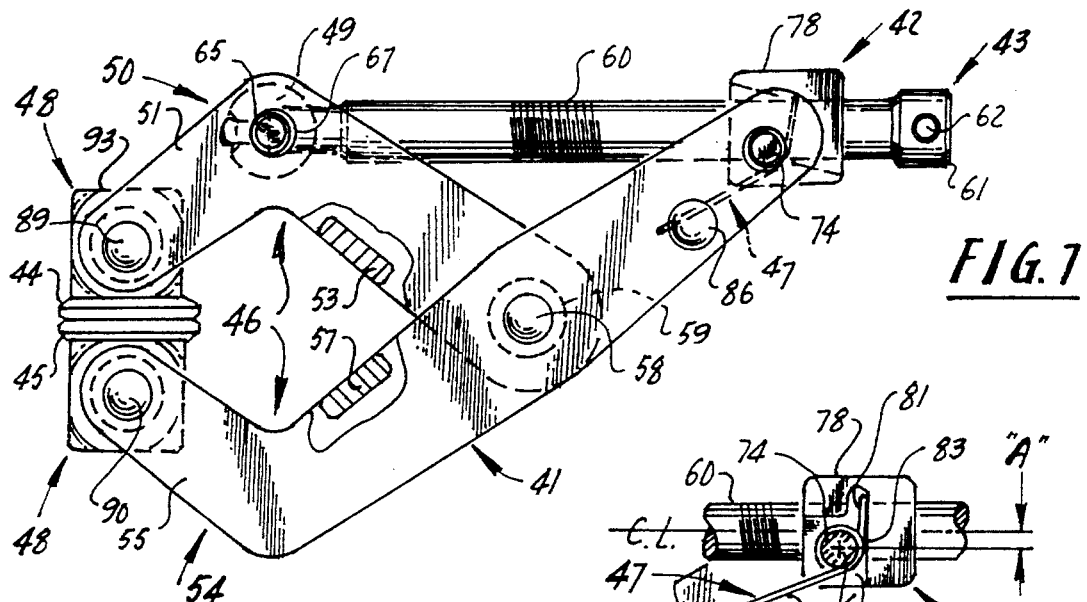
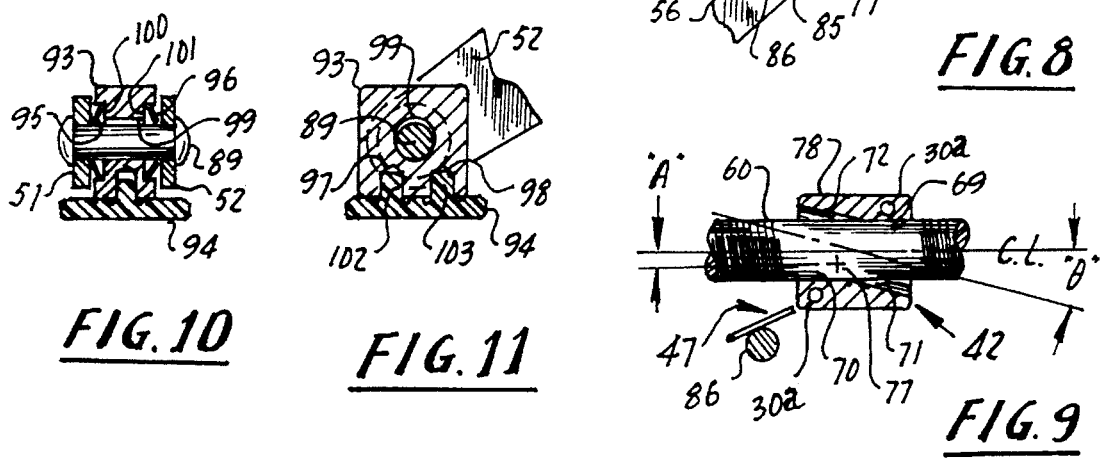

5,558,481

SELF-LOCKING QUICK DISENGAGEMENT NUT FOR CLAMPS AND THE LIKE

CROSS-REFERENCE

This application is a continuation-in-part of my prior application, Ser. No. 08/187,739, filed Jan. 28, 1994, now abandoned, "Snap Clamp", the entire disclosure of which is incorporated herein by this reference.

FIELD OF THE INVENTION

This invention relates to quick closing clamps and similar mechanisms that utilize threaded thrust screws or a threaded drive mechanism which can be released.

BACKGROUND OF THE INVENTION

Screw threads are often used as the force-producing mechanism in clamps. They are also used in various mechanisms which utilize a screw thread as a measuring device wherein the thread pitch is a distance reference. In conventional structures, a nut is engaged on the screw thread. However, in conventional mechanisms, the screw must be rotated with respect to the nut when it is desired to position the nut at a different location along the screw.

A few mechanisms have been developed where it is possible to disengage the nut from the screw in order to permit quick linear motion of the nut along the length of the screw. These have various drawbacks. When a spring is used to thrust the nut laterally against the screw, the limiting axial force on the screw is the spring force times the cosine of the thread angle. When the geometry is created to use the axial force of the screw with respect to the nut to thrust the nut into engagement with the screw, large screw bending forces are created which limit the axial force applied by the screw to a function of its columnar strength. Thus, there is need for a quick closing clamp and related structure which is capable of rapid adjustment and large forces without creating undue bending forces on the screw.

SUMMARY OF THE INVENTION

In order to aid in the understanding of this invention, it can be stated in essentially summary form that it is related to a quick closing clamp and to the specific nut and screw relationship which produces nut engagement on the screw without causing excess screw bending forces. This is accomplished by having the effective pivot point of the nut about a one-half radius outward from the screw center line so that compressive stresses are always greater than bending stresses.

It is, thus, a purpose and advantage of this invention to provide a self-locking quick disengagement nut for clamps and the like which permits a screw-nut combination of a clamp to be moved quickly into position and, thereafter, the nut engages on the screw to provide clamping force which is limited by compressive strength of the various members.

It is a further purpose and advantage of this invention to provide a clamp structure which can be easily used by quickly moving it into clamping position and thereupon providing clamping force.

Other purposes and advantages of this invention will become apparent from a study of the following portion of the specification, including the claims and the drawings.

BRIEF DESCRIPTION OF THE DRAWINGS

FIG. 6 is a top view of another preferred embodiment of a clamp assembly containing the self-locking quick disengagement nut of this invention with parts broken away and parts taken in section.

FIG. 7 is a front view of the clamp assembly of FIG. 6.

FIG. 8 is a sectional view, with parts broken away, of the installed self-locking quick disengagement nut block and the torque spring taken along line 8—8 of FIG. 6.

FIG. 9 is a sectional view of the installed self-locking quick disengagement nut block and the threaded shaft taken along line 9—9 of FIG. 6.

FIG. 10 is a sectional view of the jaw block, taken along line 10—10 of FIG. 6.

FIG. 11 is a sectional view of the jaw block, taken along line 11—11 of FIG. 6.

DESCRIPTION OF THE PREFERRED EMBODIMENT

Figure 1:
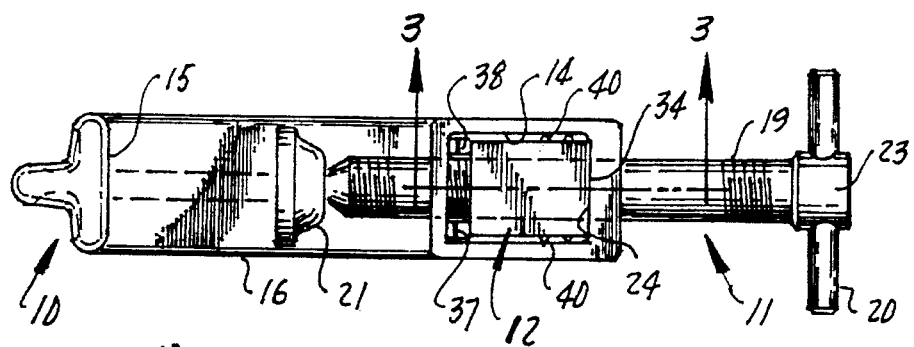
FIG. 1 is a top view of a C-clamp assembly containing a first preferred embodiment of the self-locking quick disengagement nut of this invention.
Figure 2:
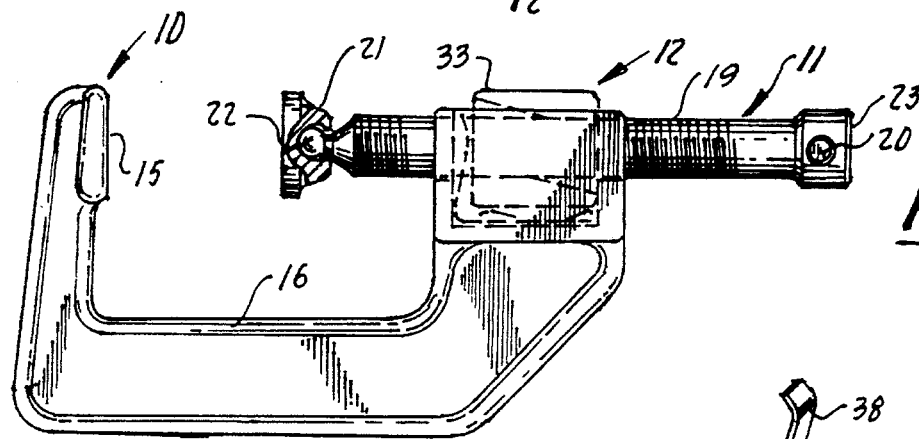
FIG. 2 is a front view of the C-clamp assembly of FIG. 1.

The C-clamp body 10 shown in FIG. 1 and FIG. 2 is a conventional type that is in wide use today. The present invention, however, extends the capability of the conventional C-clamp body 10 by introducing a novel structure for engaging and later disengaging from the threaded shaft assembly 11 by the utilization of a self-locking quick disengagement nut block assembly 12.

Figure 4:
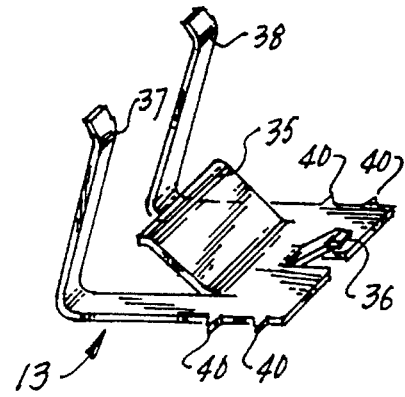
FIG. 4 is an isometric view of the retainer spring shown in FIG. 3.
Figure 3:
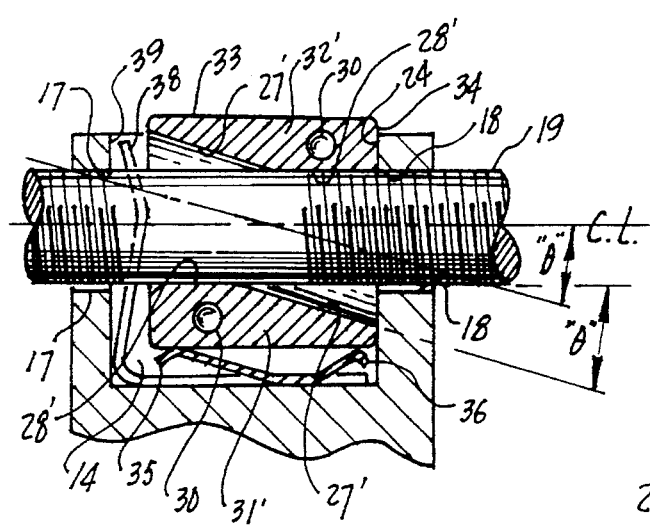
FIG. 3 is an enlarged sectional view of the installed self-locking quick disengagement nut block, the retainer spring, the threaded shaft, and the C-clamp nut block recess taken along line 3—3 of FIG. 1.

The first preferred embodiment is shown in FIG. 1 and FIG. 2 and is comprised of the C-clamp body 10, the threaded shaft assembly 11, the self-locking quick disengagement nut block assembly 12, and the retainer spring 13, as shown in FIG. 3 and FIG. 4.

The C-clamp body 10 is a conventional type that has been modified to allow the installation of the block assembly 12 which includes walls which define nut block recess 14. The C-clamp body 10 has the gripping surface 15 that engages the surfaces of workpieces during clamping operations and is comprised of the bracket arm 16 which, for this example, is a cast or forged solid piece. The C-clamp body 10 has the through holes 17 and 18, as shown in FIG. 3, so that the threaded shaft 19 passes through them. The threaded shaft assembly 11 is comprised of the threaded shaft 19, the turning handle 20, and the compliant gripping pad 21. The threaded shaft 19 engages the nut block assembly 12, as shown in FIG. 3, and is comprised of the ball end 22 and the handle end 23.

Figure 5:
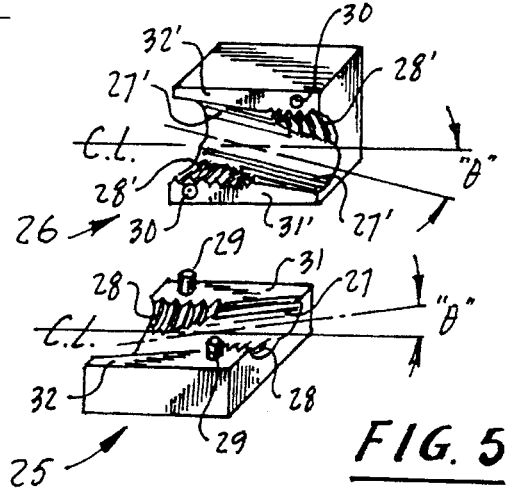
FIG. 5 is an isometric view of the two halves that comprise the self-locking quick disengagement nut block as produced by a preferred method of manufacture.

The self-locking quick disengagement nut block assembly 12 is a unique feature of the first preferred embodiment and is shown in FIG. 3 and FIG. 5. The nut block assembly 12 is comprised of the left half block 25 and the right half block 26, as shown in FIG. 5, so that the blocks can be fabricated by a die or powder metallurgy process. For example, the left half block 25 has the semi-cylindrical slot 27 offset at an angle θ with respect to the centerline C.L. of the semi-cylindrical threaded portions 28. The pins 29 are set away from the slots. The right half block 26 has the semi-cylindrical slot 27' also offset at an angle θ with respect to the centerline. The semicircular threaded portions 28', and the holes 30 to receive pins 29 of the left block 25 are away from the slots. The left half block 25 and the right half block 26 are pressed together and are bonded at the lower face surfaces 31 and 31' and at the upper face surface 32 and 32' to complete the nut block assembly 12. After assembly, the through hole defined by the joining of the semi-cylindrical slots 27 and 27' is of a slightly larger diameter than the threaded shaft 19 to serve as a clearance hole. The joining of the semicircular threaded portions 28 and 28' also defines a matching threaded hole configuration that is designed for threaded engagement with the threaded shaft 19. The completed assembly is installed in the nut block recess 14 of the C-clamp bracket 10, as shown in FIG. 1, FIG. 2 and FIG. 3. Further, the space between the front recess wall 39 and the rear recess wall 24 of the nut block recess 14 of the C-clamp 10 is sized with respect to the nut block 12 to act as a stop when the assembly 12 is rotated to the desired angle θ via thumb pressure on the contact nut block area 33. The corners of the nut block engage the ends of the recess to limit rotation of the nut block when the centerline of the clearance hole is parallel to the centerline of the threaded shaft or screw 19.

The retainer spring 13 is utilized to hold the threaded portions 28 of the nut block assembly 12 normally engaged with the threaded shaft assembly 19 and is shown in FIG. 3 and FIG. 4. The retainer spring 13 also serves to provide resistance for the rapid disengagement feature, when thumb pressure on the contact area 33 actuates the desired thread disengagement function. For this example, the retainer spring is fabricated by forming a tempered spring sheet metal to the configuration shown in FIG. 4. It should be noted that the utilization of compression springs or other spring means can be readily used to accomplish the same function. The primary spring arm 35 serves to force the nut block assembly 12 into a position where it is normally engaged with the threaded shaft 19. The spring force of the secondary spring arm 36 is relatively weaker than the primary spring arm 35. Thus, when the contact area 33 is pressed down, the secondary spring arm 36 helps lift up the nut block assembly 12 to provide desired disengagement position. The third spring arms 37 and 38 push the rear surface 34 of the nut block assembly 12 against the rear recess wall 24 in a normal position. The installation tabs 40 serve to fasten the retainer spring 13 in the desired position in the nut block recess 14 and to offer an optimized method of fastening. The rear surface 34 is at a right angle to the centerline of the threaded shaft 19 when the threaded portions 28 and 28' of the nut are in full engagement with the threads on shaft 19.

The normal position of the nut 12 in its recess 14 is shown in FIG. 3. Here, the flat right side of the nut is in contact with the flat inside 24 of the recess and, in this position, the threads of the nut are fully engaged with the threads on shaft 19. This is because the centerline of the shaft is at a right angle to the flat interior surface 24 of the recess and at a right angle to the flat rear surface 24 of the nut assembly when the nut is fully engaged on the threads. Release of the nut is accomplished by pressing down on the release area 33. Finger pressure deflects spring 35 to permit rotation of the nut in the counter-clockwise direction in the pocket. The rotation is through θ so that the clearance hole in the nut surrounds the shaft 19 without threaded engagement. The spring finger 36 helps press up the right side of the nut to an out-of-engagement position. The spring fingers 37 and 38 are engaged on the nut to thrust it to the right. Thus, when the nut is rotated, these spring fingers are deflected to the left. However, their deflection force is small and is easily overcome by thumb pressure. Release of thumb pressure on the deflection area 33 permits the spring finger 35 to return the nut into the engagement position shown in FIG. 3. The force of spring fingers 37 and 38 to the right also aids in this alignment because they thrust the surface 34 against the surface 24.

The jaw clamp assembly 41, which incorporates the second preferred embodiment of my self-locking quick disengagement nut, is shown in FIG. 6 and FIG. 7. The present invention, however, extends the capability of the conventional type jaw clamp assembly 41 by incorporating a unique self-locking quick disengagement nut block 42, thereby introducing a novel method of easy disengagement from the threaded shaft assembly 43. Further, the present invention introduces a novel jaw clamp assembly 48 that resists undesirable rotation and allows easy interchange ability of jaw blocks 44 and 45.

The preferred embodiment shown in FIG. 6 and FIG. 7 is comprised of the self-locking quick disengagement nut block 42, the threaded shaft assembly 43, the jaw arm assembly 46, the torque spring 47, the jaw block assemblies 48, and a number of fasteners.

The jaw arm assembly 46 is similar to a conventional type that is in wide use today. The top jaw arms 50 are comprised of the top left arm 51 and the top right arm 52. The two top arms are connected by the structural ribs 53 and 59. The bottom jaw arms 54 are comprised of the bottom left arm 55 and the bottom right arm 56. The two bottom arms are connected by the structural rib 57. It should be noted that the preferred embodiment intends to optimize the manufacturability of the top jaw arms 50 and the bottom jaw arms 54, so that a casting process could produce each arm in a molding process. The top jaw arms 50 and the bottom jaw arms 54 are connected by a rivet 58 that provides a rotational degree of freedom, as shown in FIG. 6.

The threaded shaft assembly 43 is comprised of the threaded shaft 60, the turning handle end 61, the turning handle 62, and the driver block fastening end 63. The threaded shaft 60 engages the threaded portions 69 and 70 of the nut block 42, as shown in 9. The driver block fastening end 63 is fastened to the driver block 49 in a manner that allows a full rotational degree of freedom, such as the end 64 being flared, as shown n FIG. 6.

The driver block 49 is positioned between the top jaw arms 50. The extension pins 65 and 66 on the driver block 49 extend through the holes 67 and 68, as shown in FIG. 6 and FIG. 7, to allow full unrestrained rotation of the driver block 49 with respect to the top jaw arms 50.

The nut block 42 is a unique feature of the preferred embodiment and is shown in FIGS. 6, 7, 8 and 9. As shown in FIG. 9, the threaded portions 69 and 70 define a threaded hole configuration that is designed for threaded engagement with a threaded shaft 60. The through hole surfaces 71 and 72 define portions of a cylindrical through hole that is of a slightly larger diameter than the threaded shaft 60 and are positioned with its axis at an angle θ with respect to the centerline axis of the threaded hole, as shown in FIG. 9. The nut block 42 carries the rotation pins 73 and 74 that extend through the through holes 75 of the bottom jaw arms 54. The pivotal point 77 of the rotation pins 73 and 74 is shown in FIG. 9. It should be noted that the position of the pivotal point 77 provides a unique self-locking action, whereby no accidental thread disengagement may occur when the jaw assembly 41 is clamped onto a workpiece. When the quick disengagement feature is desired, the operator applies pressure to the contact area 78, whereby the nut block 42 rotates and the threaded portions 69 and 70 are thereby disengaged from the threaded shaft 60 The dimension "A", as shown in FIGS. 8 and 9, should be taken into consideration because, if the distance "A" is more than half of the diameter of the threaded shaft 60, then the threaded shaft 60 not only bends between the area nut block 42 and driver block 49, but also builds up resistance against the torque that restricts the desired clamping force. It is critical that the dimension "A", which is the distance between the pivot axis and the screw axis when it is engaged with the threaded portion of the nut, is between zero and half of the major diameter of the threaded shaft. It is preferably about one-quarter of the major diameter of the threaded shaft, as shown in FIG. 9. This positioning minimizes the bending force applied to the threaded shaft and yet provides self-locking force to the nut. If the pivot point of the nut was on the centerline, there would be no self-locking force. If the pivot point was outside of the major diameter, the bending force on the threaded shaft becomes a limiting stress on the clamp unless excessive columnar strength is provided. The position of the rotation pins 73 and 74 in the axial direction is positioned from the center to front of center of nut block 42. The normally engaged position is maintained by the torque spring 47, which forces the nut block 2 into threaded engagement with the threaded shaft 60.

Nut block 42 can be made by the same processes as the nut block 12. Specifically, the nut block 42 can be manufactured in two halves. The plane of division is preferably the plane through the axes of both the threaded hole and the clearance hole. This is the plane of the paper in FIG. 9. Guide pin holes 30a, corresponding to the guide pin holes 30 in FIG. 5, are seen in FIG. 9.

The torque spring 47 serves to force the threaded engagement of the nut block 42 to the threaded shaft 60, as shown in FIGS. 8 and 9. The torque spring 47 is looped about the rotation pins 73 and 74 and rests in the spring recesses 79 and 80 of the nut block 42, where the spring arms 81 and 82 contact the walls 83 and 84, respectively. The primary spring arm 85 rests on the support pin 84, which extends between the bottom jaw arms 54 whereby the ends are flared, as shown in FIG. 6. The torque spring 47 is prewound and thereby maintains thread engagement and further resists disengagement. The nut is thus rotated on its pivot pins in a direction to engage the threads on the threaded shaft. This spring torque applied to the threaded nut is applied from the adjacent clamp structure similar to the structure of FIG. 3 and is not applied by spring engagement on the threaded shaft.

The jaw block assemblies 48 are shown in FIGS. 7, 10 and 11 and are in a unique feature of the clamp. The jaw block assemblies 48 are fastened to the top jaw arms 50 and the bottom jaw arms 54 by the fastening pins 89 and 90, respectively, the ends of which are flared, as shown in FIG. 6. The jaw block assemblies 48 are comprised of the jaw block housing 93, the spring washers 95 and 96, and the jaw block 94. The jaw block housing 93 has the through hole 99 so that the jaw block housing 93 can rotate about the fastening pin 89, as shown in FIGS. 10 and 11. The jaw block housing 93 has the round recesses 100 and 101 into which the spring washers 95 and 96 are compressed between the top jaw arm plate 51 and 52 and the jaw block housing 93, thereby providing unique resistance to rotation. The jaw block 94 has the extension pins 102 and 103. The jaw block 94 can be readily installed and removed from the jaw block housing 93 that has holes 97 and 98 to receive the extension pins 102 and 103. This structure has the capability of changing the jaw block 94 permitting the matching of jaw block 94 to the workpiece surface characteristics.

It should be noted that the scope of this invention is not limited to the C-clamp or the pivotal jaw clamp as illustrated, but the self-locking quick disengagement nut can be utilized on various additional applications such as a pipe cutter. For this use the gripping surface 15, as shown in FIG. 1, would be substituted by a cutting wheel and the compliant gripping pad 21 would be substituted by two rollers, or vice versa. The nut block assembly 12, as shown in FIG. 2, and the nut block 42 in FIG. 6 can be fabricated by conventional machining. Alternatively, they can be fabricated in two halves by a power metallurgy process, as demonstrated in FIG. 5.

The application of the present invention may be extended beyond what is outlined in the present disclosure by those skilled in related art. The construction of the preferred embodiment may be modified without departing from the scope of the claims. All matters contained in the above description and shown in the accompanying drawings is for illustration purposes only and should not be interpreted in a limiting sense.

What is claimed is:

1. An assembly comprising:

first and second members;

a thrust screw having first and second ends, said thrust screw having threads intermediate said ends;

means for rotatably connecting said second end of said thrust screw to said second member;

a nut block having a threaded portion, the major diameter of said threaded portion lying substantially on a cylinder having a threaded portion axis, and a non-threaded portion, said non-threaded portion being a portion of a cylindrical surface having a diameter larger than the major diameter of said thrust screw and having a clearance axis, said axes intersecting each other, said nut block being movably connected to said first member for engaging said thrust screw to permit said first and second members to be moved with respect to each other by rotation of said thrust screw, said nut block being configured to be movable from an engaged position where it is engaged on said thrust screw and a disengaged position where it is disengaged from said thrust screw; and a spring connected between said first member and said nut block to thrust said nut block toward its engaged position so that manual release deflects said spring and permits said nut block to disengage from said thrust screw to permit the free movement of said thrust screw with respect to said first member.

2. The assembly of claim 1 wherein a pivot pin defines a rotational axis for said nut block rotating from an engaged to a disengaged position.

3. The assembly of claim 1 wherein said first and second members are movable members of a clamp and there are first and second jaw blocks respectively mounted on said first and second members to be movably mounted with respect to said first and second members, respectively, said first and second members being movable to bring said jaw blocks toward and away from each other to clamp material therebetween; and friction means between at least one of said jaw blocks and its respective member for retaining said jaw block in a selected position with respect to each member.

4. The assembly of claim 1 wherein said second member has a recess therein, with a facing surface in said recess, said nut block being positioned within said recess, said nut block having a face which is oriented so that when said faces lie together, said threaded axis of said nut block lies with the axis of said thrust screw.

5. The assembly of claim 4 wherein spring thrusts said faces together.

6. An assembly comprising:

first and second members;

a thrust screw having first and second ends, said thrust screw having threads intermediate said ends;

means for rotatably connecting said thrust screw to said second member;

a nut block formed of two parts each having a face, said nut block having a threaded portion, the major diameter of said threaded portion lying substantially on a cylinder having a threaded portion axis and a non-threaded portion, said non-threaded portion being a portion of a cylindrical surface having a diameter larger than the major diameter of said thrust screw and having a clearance axis, said axes intersecting each other, said faces lying substantially on said axes, said nut block being movably connected to said first member for engaging said thrust screw to permit said first and second members to be moved with respect to each other by rotation of said thrust screw, said nut block being configured to be movable from an engaged position where it is engaged on said thrust screw and a disengaged position where it is disengaged from said thrust screw; and a spring connected between said first member and said nut block to thrust said but block toward its engaged position so that manual release deflects said spring and permits said nut block to disengage from said thrust screw to permit the free movement of said thrust screw with respect to said first member.

7. The assembly of claim 6 wherein said two parts of said nut block are formed of powdered metal sintered together.

8. The assembly of claim 7 wherein each of said parts of nut block has interengaging surfaces thereon so that when said nut block parts are put together to form said nut block, said surfaces interengage to provide alignment.

9. The assembly of claim 8 wherein said nut block has sides which lie substantially parallel to said axes and said sides each carry a pivot pin extending therefrom.

10. The assembly of claim 9 wherein said pivot pin defines a rotational axis for said nut block rotating from an engaged to a disengaged position.

11. The assembly of claim 10 wherein said spring is a coil spring wrapped around said pivot pin.

12. An assembly comprising:

first and second members;

a thrust screw having first and second ends, said thrust screw having threads intermediate said ends;

means for rotatably connecting said thrust screw to said second member;

a nut block having a threaded portion, the major diameter of said threaded portion lying substantially on a cylinder having a threaded portion axis and a non-threaded portion, said non-threaded portion being a portion of a cylindrical surface having a diameter larger than the major diameter of said thrust screw and having a clearance axis, said axes intersecting each other, said nut block lying in an engaged position wherein said threaded portion engages said threaded screw and is in a disengaged position when said threaded portion is away from said thrust screw, said nut block having a pivot pin which defines the rotational axis for said nut block, when said nut block rotates from an engaged to a disengaged position, said pivot pin lying closer to said threaded shaft axis than the major diameter of said threaded shaft, said nut block engaging said thrust screw to permit said first and second members to be moved with respect to each other by rotation of said thrust screw, said nut block being configured to be movable from an engaged position where it is engaged on said thrust screw and a disengaged position where it is disengaged from said thrust screw; and a spring connected between said first member and said nut block to thrust said nut block toward its engaged position so that manual release deflects said spring and permits said nut block to disengage from said thrust screw to permit the free movement of said thrust screw with respect to said first member.

13. An assembly comprising:

first and second members;

a thrust screw having first and second ends, said thrust screw having threads intermediate said ends;

means for rotatably connecting said thrust screw to said second member;

a nut block having a threaded portion and a non-threaded portion and said nut block lies in an engaged position wherein said threaded portion engages on said thrust screw and is in a disengaged position when said threaded portion is away from said thrust screw, a pivot pin defining a rotational axis for said nut block rotating from an engaged to a disengaged position;

said pivot pin lying closer to said threaded shaft axis than the major diameter of said threaded shaft, said nut block being for engaging said thrust screw to permit said first and second members to be moved with respect to each other by rotation of said thrust screw, said nut block being configured to be movable from and engaged position where it is engaged on said thrust screw and a disengaged position where it is disengaged from said thrust screw; and a spring connected between said first member and said nut block to thrust said nut block toward its engaged position so that manual release deflects said spring and permits said manually releasable means to disengage from said thrust screw to permit the free movement of said thrust screw with respect to said first member.

14. The assembly of claim 13 wherein said spring is a coil spring wrapped around said pivot pin.

15. An assembly comprising:

first and second members, said second member having a recess therein, with a facing surface in said recess;

a thrust screw having first and second ends, said thrust screw having threads intermediate said ends;

means for rotatably connecting said second end of said thrust screw to said second member;

a nut block having a threaded portion, the major diameter of said threaded portion lying substantially on a cylinder having a threaded axis and a non-threaded portion, said non-threaded portion being a portion of a cylindrical surface having a diameter larger than the major diameter of said thrust screw and having a clearance axis, said axes intersecting each other, said nut assembly being positioned within said recess, said nut assembly having a face which is oriented so that when said faces lie together, said threaded axis of said nut assembly lies with the axis of said thrust screw, said nut block being for engaging said thrust screw to permit said first and second members to be moved with respect to each other by rotation of said thrust screw, said nut block being configured to be movable from an engaged position where it is engaged on said thrust screw and a disengaged position where it is disengaged from said thrust screw; and a spring connected between said first member and said nut block to thrust said nut block toward its engaged position so that manual release deflects said spring and permits said nut block to disengage from said thrust screw to permit the free movement of said thrust screw with respect to said first member.

16. The assembly of claim 15 wherein there is a spring and said spring thrusts said faces together.

17. The assembly of claim 16 wherein said spring has at least one finger urging said nut into thread engagement with said thrust screw and said spring has at least one finger thrusting said faces together.

18. The assembly of claim 15 wherein said nut is formed of two parts each made of metal powder sintered together, said two parts having interengaging surfaces so that said two parts can be joined in only one relative position.

19. A nut comprising:

first and second nut parts, each of said nut parts being made of powdered metal sintered together, each of said nut parts having a joining face, said joining faces lying together when said nut parts are assembled into a nut, said nut having a threaded opening therethrough which defines a threaded opening axis and said nut having a clearance hole therethrough which defines a clearance hole axis, said axes intersecting each other within said nut and said axes lying substantially on said joined faces.

20. The nut of claim 19 wherein said faces of said nut parts are configured so that said nut parts can be assembled together in only a single configuration.

21. An assembly comprising:

a threaded thrust screw having a first end and a second end, said thrust screw being threaded therebetween, said first end of said thrust screw being engaged with a first member;

a second member, said second member having a recess therein, said recess having a thrust face, an opening through said recess including an opening through said thrust face;

a nut in said recess, a thrust face on said nut, said nut having first and second axes therethrough, said first and second axes intersecting each other within said nut and lying at an acute angle with respect to each other, a threaded surface formed in said nut around said first axis, said threaded surface being configured to engage said thrust screw, a clearance hole through said nut formed as a substantially cylindrical surface around said second axis, said clearance hole being larger than the major diameter of said thrust screw, said thrust faces lying together when said threaded surface axis lies coincident with the axis of said thrust screw; and a spring engaged between said second member and said nut urging said thrust faces together.

* * * * *